(12) United States Patent
Tanaka

(10) Patent No.: US 12,406,512 B2
(45) Date of Patent: Sep. 2, 2025

(54) INFORMATION PROCESSING APPARATUS, INFORMATION PROCESSING METHOD, COMPUTER PROGRAM PRODUCT, AND RECORDING MEDIUM

(71) Applicants: KABUSHIKI KAISHA TOSHIBA, Tokyo (JP); TOSHIBA DIGITAL SOLUTIONS CORPORATION, Kawasaki (JP)

(72) Inventor: Ryohei Tanaka, Kawasaki Kanagawa (JP)

(73) Assignees: Kabushiki Kaisha Toshiba, Tokyo (JP); Toshiba Digital Solutions Corporation, Kawasaki Kanagawa (JP)

( * ) Notice: Subject to any disclaimer, the term of this patent is extended or adjusted under 35 U.S.C. 154(b) by 389 days.

(21) Appl. No.: 17/942,858

(22) Filed: Sep. 12, 2022

(65) Prior Publication Data
US 2023/0005282 A1 Jan. 5, 2023

Related U.S. Application Data

(63) Continuation of application No. PCT/JP2021/007410, filed on Feb. 26, 2021.

(30) Foreign Application Priority Data

Mar. 24, 2020 (JP) ................. 2020-052183

(51) Int. Cl.
*G06V 30/00* (2022.01)
*G06V 30/12* (2022.01)
*G06V 30/194* (2022.01)

(52) U.S. Cl.
CPC ............ *G06V 30/12* (2022.01); *G06V 30/194* (2022.01); *G06V 2201/10* (2022.01)

(58) Field of Classification Search
CPC .. G06V 30/12; G06V 30/194; G06V 2201/10; G06V 10/803; G06V 10/82; G06N 3/08
See application file for complete search history.

(56) References Cited

U.S. PATENT DOCUMENTS

2013/0054612 A1* 2/2013 Danielyan ............. G06F 40/268
707/741
2013/0208991 A1* 8/2013 Kawasaki ............. G06V 30/246
382/229

(Continued)

FOREIGN PATENT DOCUMENTS

JP S61-18080 A 1/1986
JP H6-150061 A 5/1994

(Continued)

OTHER PUBLICATIONS

Niwa et al, Character Recognition System with Cooperation of Pattern and Symbolic Processing, Systems and Computers in Japan, vol. 26, No. 10, pp. 47-58 (Year: 1995).*

(Continued)

*Primary Examiner* — Xiao Liu
(74) *Attorney, Agent, or Firm* — Finnegan, Henderson, Farabow, Garrett & Dunner, LLP

(57) ABSTRACT

An information processing apparatus includes a memory and one or more hardware processors. The memory stores order information in which an order of pieces of meta-information for a character to be recognized is defined. The one or more hardware processors are connected to the memory and function as a recognition unit and an update unit. The recognition unit serves to perform character recognition on an image including a character string by using first meta-information specified from the pieces of the meta-information. The update unit serves to update the first meta-information to second meta-information in accordance with the order information in a case when a confidence score of the (Continued)

character recognition satisfies a predetermined condition. The character recognition is performed by using the second meta- information.

17 Claims, 9 Drawing Sheets

(56) References Cited

U.S. PATENT DOCUMENTS

2017/0011273 A1* 1/2017 Soldevila ................ G06F 18/29
2017/0213127 A1* 7/2017 Duncan .................. G16B 50/30
2021/0264463 A1* 8/2021 Jaidka ................ G06Q 30/0242

FOREIGN PATENT DOCUMENTS

| JP | H06150061 | * | 5/1994 | |
| JP | H8-190603 A | | 7/1996 | |
| JP | H08190603 | * | 7/1996 | ............ G06K 9/03 |
| JP | 2003-44785 | | 2/2003 | |
| JP | 2013-164728 A | | 8/2013 | |
| JP | 2019-79347 A | | 5/2019 | |

OTHER PUBLICATIONS

Hisao Niwa et al., "Character Recognition System with Cooperation of Pattern and Symbolic Processing," IEICE Trans. on Info. and Sys., vol. J78-D-II, No. 2, pp. 263-271 (1995).

* cited by examiner

FIG.3

| META-INFORMATION | CONNECTION DESTINATION | DIMENSION NUMBER |
|---|---|---|
| UNSPECIFIED | | 0 |
| ADDRESS | UNSPECIFIED | 1 |
| ALPHANUMERIC CHARACTERS AND SYMBOLS | UNSPECIFIED | 2 |
| KATAKANA CHARACTERS | UNSPECIFIED | 3 |
| ENGLISH WORD | ALPHANUMERIC CHARACTERS AND SYMBOLS | 4 |
| NUMERALS | ALPHANUMERIC CHARACTERS AND SYMBOLS | 5 |
| FAMILY NAME WRITTEN IN KATAKANA CHARACTERS | KATAKANA CHARACTERS | 6 |
| FIRST NAME WRITTEN IN KATAKANA CHARACTERS | KATAKANA CHARACTERS | 7 |

INFORMATION PROCESSING APPARATUS, INFORMATION PROCESSING METHOD, COMPUTER PROGRAM PRODUCT, AND RECORDING MEDIUM

CROSS-REFERENCE TO RELATED APPLICATIONS

This application is a continuation of PCT International Application No. PCT/JP2021/007410 filed on Feb. 26, 2021 which claims the benefit of priority from Japanese Patent Application No. 2020-052183, filed on Mar. 24, 2020, the entire contents of which are incorporated herein by reference.

FIELD

Embodiments described herein relate generally to an information processing apparatus, an information processing method, a computer program product, and a recording medium.

BACKGROUND

In character string recognition for predicting a likely character string with a character string image as an input, a method has been proposed to improve recognition accuracy by considering information added to the character string image. For example, in recognition of a ledger sheet image, more accurate recognition is achieved by performing different recognition processes for each of field types such as an address field, a date field, and a name field. The field type is input, as meta-information added to the character string image, to a character recognition system. The meta-information is used for identification between homomorphic characters and selection of a character that can be taken as a result of the recognition.

However, in such a conventional art, if the meta-information is wrong and if an image that is not expected by the meta-information is input, there is a possibility that the recognition accuracy is lowered.

BRIEF DESCRIPTION OF THE DRAWINGS

FIG. 3 is a table illustrating an example of a data structure of the order information stored in a storage unit;

DETAILED DESCRIPTION

An information processing apparatus according to one embodiment includes a memory and one or more hardware processors. The memory is configured to store order information in which an order of pieces of meta-information for a character to be recognized is defined. The one or more hardware processors are connected to the memory and configured to function as a recognition unit and an update unit. The recognition unit serves to perform character recognition on an image including a character string by using first meta-information specified from the pieces of the meta-information. The update unit serves to update the first meta-information to second meta-information in accordance with the order information in a case when a confidence score of the character recognition satisfies a predetermined condition. The recognition unit performs the character recognition by using the second meta-information.

Embodiments of an information processing apparatus according to the present invention will be described in detail below with reference to the accompanying drawings.

First Embodiment

Recognition accuracy using meta-information may be lowered in the following cases. For example, it is assumed here that "MAIKERU" (corresponding to "Michael" in the English language) is filled in a field of first name to be written in katakana characters (katakana is one of character types of the Japanese language) and "first name written in katakana characters" is specified as the meta-information. However, in a case where a first name of a foreigner such as "MAIKERU" above is not expected in a recognition process associated with the first name written in katakana characters, the recognition accuracy decreases.

Therefore, in a first embodiment, the meta-information is structured in advance so as to determine the order of pieces of meta-information. In the first embodiment, when a specified piece of meta-information (hereinafter, referred to as a piece of specified meta-information) has a lower confidence score in a result of the recognition, character recognition is performed again using a piece of meta-information that is updated in accordance with the order. This configuration makes it possible to obtain a more accurate result of the recognition.

Figure 1:
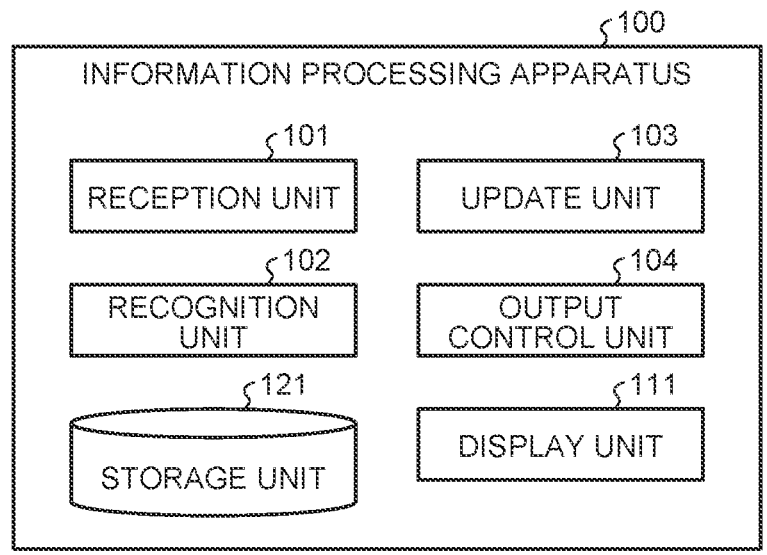
FIG. 1 is a block diagram illustrating an example of a configuration of an information processing apparatus according to a first embodiment.

FIG. 1 is a block diagram illustrating an example of a configuration of an information processing apparatus 100 according to the first embodiment. As illustrated in FIG. 1, the information processing apparatus 100 includes a display unit 111, a storage unit 121, a reception unit 101, a recognition unit 102, an update unit 103, and an output control unit 104.

The display unit 111 is an example of an output device that outputs various information processed by the information processing apparatus 100. The display unit 111 is, for example, a display device, such as a display, that displays information. The output device that outputs information is not limited to the display unit 111 (display device), and may be any device. For example, the output device may be another information processing apparatus connected via a network (wired or wireless) such as the Internet.

The storage unit 121 is a storage medium that stores various information to be processed by the information processing apparatus 100. For example, the storage unit 121 stores order information in which the order of pieces of meta-information for a character to be recognized is defined. The storage unit 121 can include any storage medium generally used, such as a flash memory, memory card, random access memory (RAM), hard disk drive (HDD), or optical disk.

Figure 2:
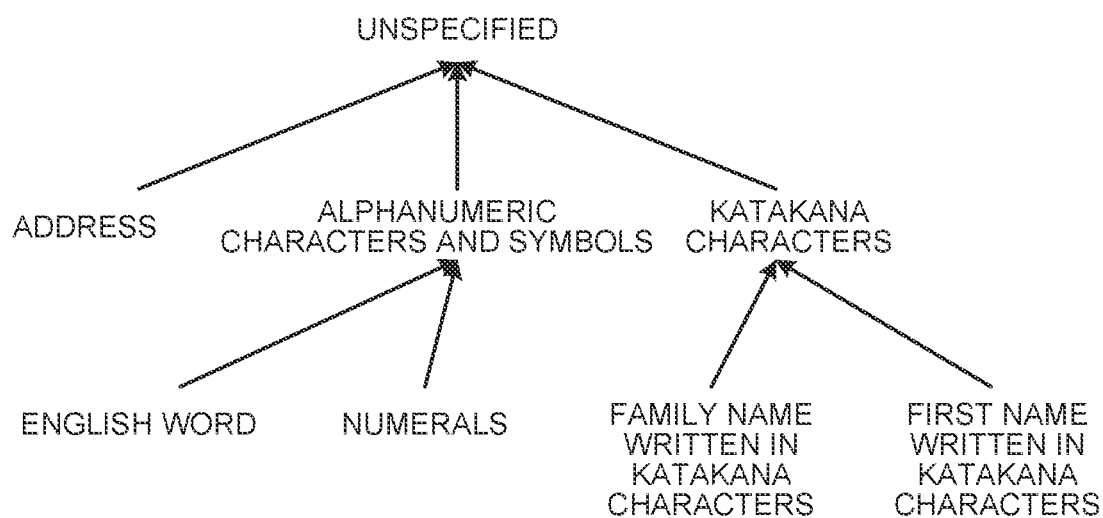
FIG. 2 is a graph illustrating an example of a data structure of order information.

Here, a data structure of the order information will be described. FIG. 2 is a graph illustrating an example of the data structure of the order information. FIG. 2 illustrates an example of the order information represented by a directed acyclic graph in which the pieces of meta-information are defined as nodes and the nodes are connected by directed edges. Note that the data structure of the order information is not limited to the directed acyclic graph.

The directed acyclic graph refers to a graph structure having no closed loop out of directed graphs including nodes and directed edges. In other words, in the directed acyclic graph, following the edges from any node does not return to the same node again. In the following, out of two nodes connected by a directed edge, a node serving as a connection source (start point) is referred to as a start node, and a node (a node serving as an end point and a connection destination node) to which the directed edge points is referred to as an end node. Of the nodes of the directed acyclic graph, a node that is not the connection source (start point) for any node is referred to as a top node, and a node that is not the connection destination (end point) for any node is referred to as a bottom node.

FIG. 2 illustrates an example of the directed acyclic graph depicting the order information in which the meta-information closer to the bottom node has subdivided sets represented by the meta-information. The order information may form a directed acyclic graph in which the meta-information closer to the top node has subdivided sets represented by the meta-information.

The directed acyclic graph of FIG. 2 includes nodes for which "unspecified", "address", "alphanumeric characters and symbols", "katakana characters", "English word", "numerals", "family name written in katakana characters", and "first name written in katakana characters" are defined as meta-information indicating field types. When attention is paid to two pieces of meta-information connected by the directed edge, the directed acyclic graph is defined such that the meta-information of the start node represents a subset of the meta-information of the end node.

For example, in FIG. 2, the top node has the field type "unspecified" and represents the largest set (total set) having no assumption in the field type. The nodes "address", "alphanumeric characters and symbols", and "katakana characters" corresponding to the node "unspecified" as the end point are equivalent to subsets of "unspecified". The nodes "English word" and "numerals" corresponding to the node "alphanumeric characters and symbols" as the end point are equivalent to subsets of "alphanumeric characters and symbols". The nodes "family name written in katakana characters" and "first name written in katakana characters" corresponding to the node "katakana characters" as the end point are equivalent to subsets of "katakana characters", As described above, the meta-information closer to the bottom node represents the subdivided sets.

FIG. 3 is a table illustrating an example of a data structure of the order information stored in the storage unit 121. As illustrated in FIG. 3, the storage unit 121 stores the directed acyclic graph in the form of a table in which the connection destination node (end node) for each of all nodes constituting the directed acyclic graph. Note that the data structure of FIG. 3 is an example, and the order information may be stored in another structure.

Returning to FIG. 1, other functions will be described.

The reception unit 101 receives inputs of various information used by the information processing apparatus 100. For example, the reception unit 101 receives an image (an image including a character string) to be subjected to the recognition process. Any method may be employed as a method of receiving each data by the reception unit 101. For example, a method of acquiring data from an external device via a network, a method of reading data stored in a storage medium, and the like can be applied. The network is a local area network (LAN), the Internet, or the like, but may be any other network. The network may be any of a wired network and a wireless network.

Moreover, the reception unit 101 receives, for example, the specified piece of meta-information that is specified by a user. Any method may be employed as a method of specifying information by the user, but, for example, a method of specifying the information by using an input device such as a keyboard or a mouse can be applied.

The recognition unit 102 performs character recognition on the image including a character string. The recognition unit 102 performs the character recognition according to the meta-information by using the specified piece of meta-information, For example, when the meta-information (field type) indicates "unspecified", the recognition unit 102 performs the character recognition on the assumption of all character types and character sequences. When the meta-information indicates "katakana characters", the recognition unit 102 performs the character recognition by limiting the character type to katakana characters, Moreover, when the meta-information indicates "family name written in katakana characters", the recognition unit 102 performs the character recognition by limiting the character string to a character string having a sequence corresponding to the family name written in katakana characters. Specifying an appropriate piece of meta-information can improve the recognition accuracy.

While any method may be employed as a. method of switching the recognition process according to the meta-information, the following three methods (M1) to (M3) can be applied, for example, (M1) A character string recognition model is prepared for each piece of meta-information. The character string recognition model is, for example, a neural network and a hidden markov model (HMM).

(M2) For character shape recognition, candidates are estimated by a common algorithm that does not use the meta-information, and different ranking processes are performed according to the meta-information upon selecting a character string candidate afterward, (M3) A character string recognition model to which the meta-information can be input as a vector in addition to a character string image is used. For example, a neural network to which the meta-information and the character string image is input and from which a result of the recognition is output can be used as the character string recognition model.

In order to transform the meta-information to the vector, for example, a one-hot vector is preferably used. The one-hot vector is a vector in Which, for example, only a dimension corresponding to a dimension number of a corresponding node becomes "1" the other dimensions become "0", and the number of dimensions is the same as the number of nodes. The dimension number is a number assigned to each node as unique identification information, for example, as illustrated in FIG. 3. In the graph structure of FIG. 3, the vector representing "family name written in katakana characters" is $(0,0,0,0,0,0,1,0)^T$.

The update unit 103 updates the meta-information in accordance with the order defined in the order information. For example, when the confidence score of the character recognition by the recognition unit 102 by using the specified piece of meta-information (first meta-information) satisfies a predetermined condition, the update unit 103 updates the specified piece of meta-information to another piece of meta-information (second meta-information) in accordance with the order information. More specifically, the update unit 103 updates a specified piece of meta-information, to a piece of meta-information connected to the specified piece of meta-information by a corresponding directed edge.

The predetermined condition is, for example, a condition where the confidence score is equal to or higher than a threshold. The condition is not limited thereto, and for example, another condition that enables determination of small confidence score may be used. For example, a condition that a difference in the confidence score between a result of the recognition haying the best confidence score and a result of the recognition haying the second best confidence score is equal to or lower than the threshold may be used.

The output control unit 104 controls output of various information by the information processing apparatus 100. For example, the output control unit 104 outputs a result of the recognition to the display unit 111 and another device that uses the result of the recognition. In addition, the output control unit 104 may have a function of displaying the pieces of meta-information on the display unit 111 in accordance with the order defined in the order information (details will be described later).

Each of the units described above (the reception unit 101, the recognition unit 102, update unit 103, and the output control unit 104) is implemented by, for example, one or more hardware processors. For example, each of the units described above may be implemented by causing the processor such as a central processing unit (CPU) to execute a program, that is, by software. Each of the units described above may be implemented by a processor such as a dedicated integrated circuit (IC), that is, hardware. Each of the units described above may be implemented by using software and hardware in combination. In a case where two or more processors are used, each of the processors may implement one of the units, or may implement two or more of the units.

Figure 4:
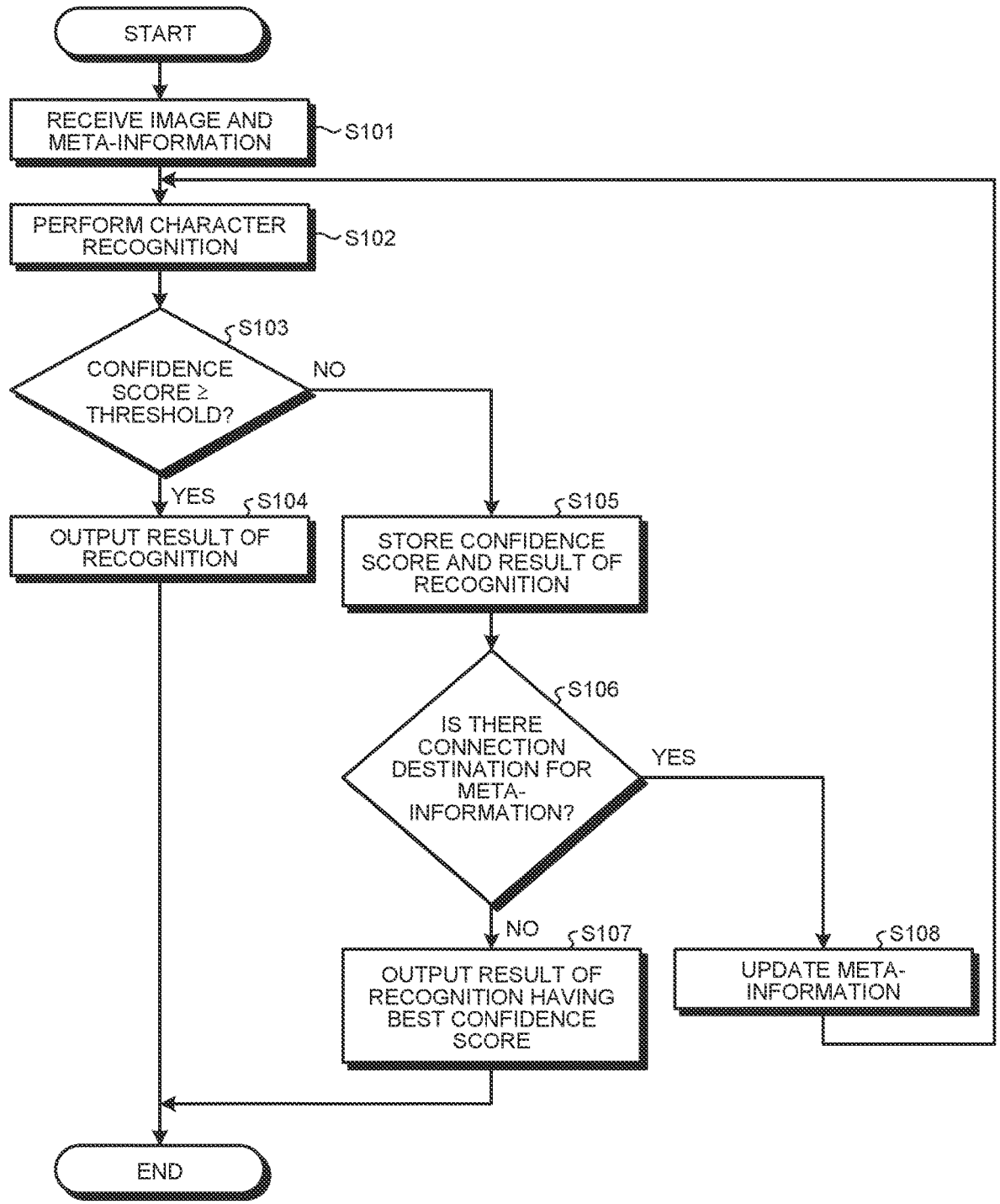
FIG. 4 is a flowchart illustrating an example of a recognition process according to the first embodiment.

Next, the recognition process performed by the information processing apparatus 100 according to the first embodiment configured as described above will be described. FIG. 4 is a flowchart illustrating an example of the recognition process according to the first embodiment.

The reception unit 101 receives an image to be recognized and the meta-information (Step S101). The recognition unit 102 performs the character recognition on the received image and meta-information, predicts a likely character string and the confidence score of the character string, and outputs the predicted confidence score and character string (Step S102). The recognition unit 102 determines whether the confidence score is equal to or higher than the threshold (Step S103).

Note that the threshold may be a predetermined constant value or may be a value changed in accordance with a rule. The rule includes, for example, a rule of increasing the threshold every time the meta-information is updated (Step S107 described later) and the character recognition in Step S102 is performed. Examples of the rule of increasing the threshold include a rule of increasing the threshold by multiplying the threshold by a predetermined multiplying factor (for example, 1.1 times) every time the character recognition is performed, a rule of adding a predetermined value every time the character recognition is performed, and the like.

In a case when the confidence score is equal to or higher than the threshold (Step S103: Yes), the recognition unit 102 outputs the predicted character string as a result of the recognition (Step S104), and finishes the recognition process. In a case when the confidence score is not equal to or higher than the threshold (Step S103: No), the recognition unit 102 stores the predicted confidence score and character string (result of the recognition) in the storage unit 121 (Step S105).

The update unit 103 determines whether there is the connection destination for the specified piece of meta-information (meta-information used for the character recognition) (Step S106). For example, the update unit 103 refers to the order information and determines that there is no connection destination for the specified piece of meta-information in a case when the specified meta-information is the top node. When there is no connection destination (Step S106: No), the update unit 103 outputs a result of the recognition having the best confidence score from the results of the recognition having been stored in the storage unit 121 (Step S107), and finishes the recognition process, When there is the connection destination for the specified piece of meta-information (Step S106: Yes), the update unit 103 updates the meta-information in accordance with the order information (Step S108). For example, the update unit 103 updates the piece of meta-information to another piece of meta-information corresponding to the connection destination node defined in the order information. In the order information as illustrated in FIGS. 2 and 3, a piece of meta-information is updated to another piece of meta-information belonging to a larger set.

After that, the process returns to Step S102, and the character recognition is performed again by the recognition unit 102 by using the updated meta-information.

The result of the recognition output in Step S107 may be determined in consideration of not only the confidence score but also another factor. For example, the update unit 103 may add the number of repetitions of the character recognition (Step S102) to an evaluation index in addition to the confidence score, select a result of the recognition having a smaller number of repetitions and better confidence score, and output the result. Moreover, for example, the update unit 103 may select a result of the recognition most frequently obtained, from the stored results of the recognition and output the result.

A specific example of the recognition process will be described below. It is assumed that the image to be recognized is a character string image including a character string "MAIKERU", the specified piece of meta-information is "first name written in katakana characters", and a threshold of the confidence score is "0.5". Moreover, in a case where the meta-information is "first name written in katakana characters", a Japanese first name "MAIKO" is expected, whereas a foreign first name "MAIKERU" is unexpected. Meanwhile, "MAIKERU" is expected when the meta-information is "katakana characters".

It is assumed that the result of the recognition is "MAIKO" and the confidence score is "0.3" in the first time of character recognition (Step S102), on the above assumption. In this case, the confidence score is lower than the threshold (Step S103: No), the meta-information is updated to "katakana characters" that is the connection destination of "first name written in katakana characters" (Step S108). It is assumed that the character recognition (Step S102) is performed again with the updated meta-information and the result of the recognition is "MAIKERU" and the confidence score is "0.8". The confidence score becomes equal to or higher than the threshold (Step S103: Yes), so that "MAIKERU" is output as the result of the recognition (Step S104).

In a case where the present embodiment is not employed, "MAIKO" having the lower confidence score is output as the result of the recognition from the character recognition according to "first name written in katakana characters" that is the specified piece of meta-information. On the other hand, by employing the present embodiment, it is possible to update the meta-information to "katakana characters" and perform the character recognition again, so that "MAIKERU" having the higher confidence score can be output as the result of the recognition.

Figure 5:
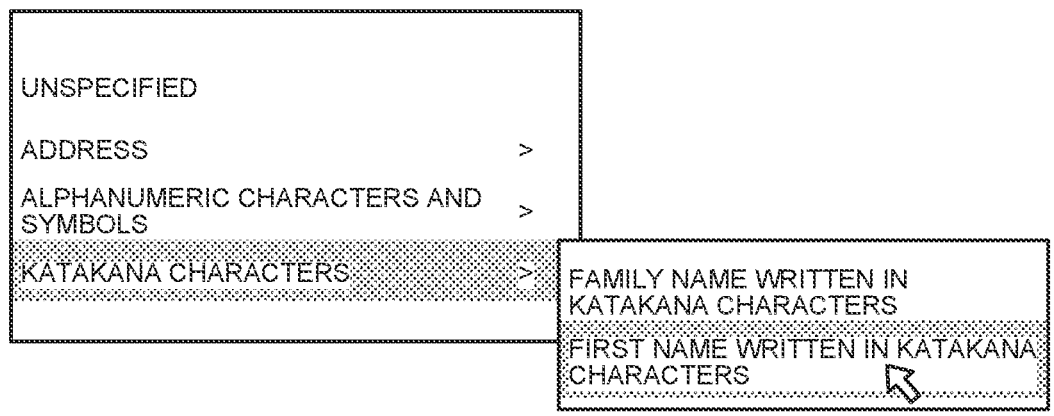
FIG. 5 is a diagram illustrating an example of GUI for specifying the meta-information.

The meta-information used in the recognition process is specified by, for example, the user. The output control unit 104 may display pieces of meta-information that can be specified by the user, in accordance with the order information. FIG. 5 is a diagram illustrating an example of a graphical user interface (GUI) for specifying a piece of meta-information.

For example, the output control unit 104 sequentially displays the pieces of meta-information according to the following procedure. First, the output control unit 104 displays a piece of meta-information corresponding to the top node of the directed acyclic graph stored in the storage unit 121, that is, a node for which there is no connection destination. When one of the displayed pieces of meta-information is selected by the user, the output control unit 104 further displays pieces of meta-information connected to the selected piece of meta-information. Hereinafter, similar processing is repeated according to selection by the user.

In a case where there is only one top node, it is clear that the top node is selected, and therefore, nodes connected to the top node may also be displayed. FIG. 5 illustrates an example in which a piece of meta-information "unspecified" corresponding to the top node and the three pieces of meta-information "address", "alphanumeric characters and symbols", and "katakana characters" corresponding to the nodes connected to the top node are initially displayed. Moreover, FIG. 5 illustrates an example in which two pieces of meta-information "family name written in katakana characters" and "first name written in katakana characters", each corresponding to the nodes connected to "katakana characters", are further displayed in response to the selection of "katakana characters".

Any method may be employed as a method for selection by the user. For example, a method of clicking a piece of meta-information, a method of pointing to a piece of meta-information (mouse over etc.), and the like can be applied.

Displaying the pieces of meta-information hierarchically organized as described above makes it possible to facilitate selection of a piece of meta-information by the user, even when the number of pieces of meta-information is large and the graph structure is complicated.

Figure 6:
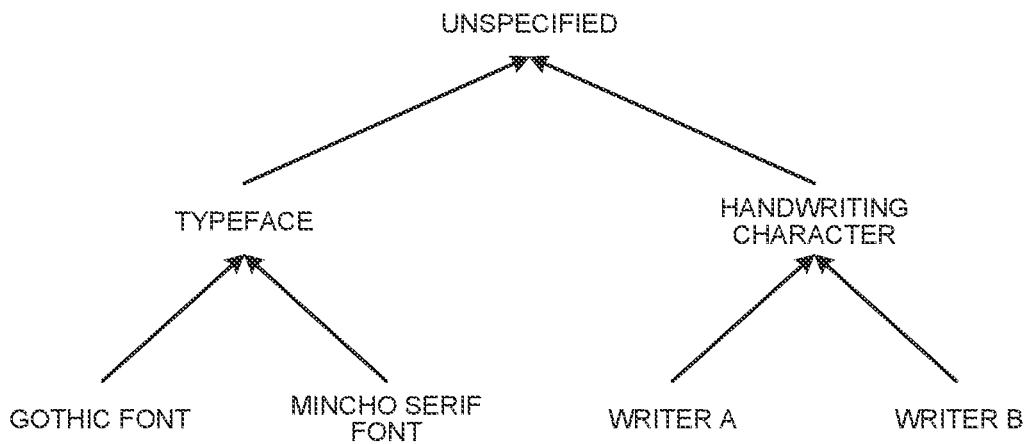
FIG. 6 is a graph illustrating an example of a data structure of the order information.

The example of the meta-information as the field type has been described above, whereas the meta-information may be any other information. For example, character shapes of handwriting character, typeface, and the like may be used as the meta-information. FIG. 6 is a graph illustrating an example of a data structure of the order information with character shapes as the meta-information.

FIG. 6 illustrates an example in which pieces of meta-information indicating writing persons such as "writer A" and "writer B" are set as subsets of "handwriting character", and pieces of meta-information indicating fonts such as "Gothic font" and "Mincho serif font" are set as subsets of "typeface", First Modification The number of pieces of order information indicating the meta-information is not limited to one, and may be N or more (N is an integer of 2 or more). For example, two pieces of order information, that is, the order information illustrated in FIG. 2 (FIG. 3) and the order information illustrated in FIG. 6, may be used. In this configuration, the storage unit 121 stores two pieces of order information corresponding to two types of meta-information (field type and character shape) and represented by directed acyclic graphs.

The recognition unit 102 performs a recognition process according to two pieces of meta-information. In a case where two pieces of order information of FIG. 2 (field type) and FIG. 6 (character shape) are used, recognition process is performed in 56 ways by combining eight field types and seven character shapes. In other words, the recognition unit 102 performs the character recognition by using N pieces of meta-information specified from each of pieces of meta-information defined in the N pieces of order information.

The meta-information may be any type such as language and image capture condition, in addition to the field type and the character shape. By using plural types of meta-information, it is possible to assume more detailed conditions and further improve the prediction accuracy of the recognition unit 102.

Second Modification

The meta-information input by the user may be pieces of weighted meta-information. For example, in FIG. 2, weights are assigned to the pieces of meta-information, for example, a weight of "1.0" is assigned to "address" and a weight of "0.6" is assigned to "first name written in katakana characters".

In this configuration, the recognition unit 102 preferably performs the character recognition by using all pieces of input meta-information to output a result of the recognition that is the best in evaluation value (for example, a product of the weight and the confidence score) obtained from the weight and the confidence score. Thereafter, the meta-information can be updated as described in the above embodiment.

Specification of the pieces of weighted meta-information is useful when the meta-information (such as a field type) is limited to some extent but is not reliable. For example, it is possible to store the meta-information estimated in an estimation process or the like of estimating the meta-information, in association with the weight equivalent to the confidence score of the estimation, and perform the character recognition by using the stored meta-information. Using a system that estimates (predicts) the meta-information as described above often provides a result of the prediction having probability distribution, and thus, a function of specifying pieces of meta-information with weights is effective.

As described above, in the information processing apparatus according to the first embodiment, the order information (or graph structure) indicating the order of the pieces of meta-information is used to flexibly update the meta-information even for an unexpected input, enabling more accurate recognition. Moreover, according to the present embodiment, sequentially displaying the pieces of meta-information in accordance with the order information makes it possible to implement the GUI from which the user can specify appropriate piece of meta-information.

Second Embodiment

In the first embodiment, the number of connection destinations of one piece of meta-information that is one or less has been described. In a second embodiment, the number of connection destinations of one piece of meta-information that is two or more will be described.

Figure 7:
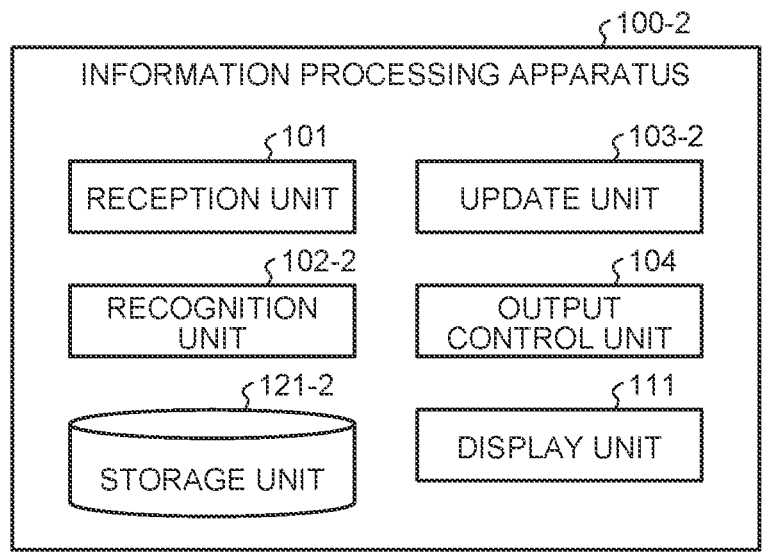
FIG. 7 is a block diagram illustrating an example of a configuration of an information processing apparatus according to a second embodiment.

FIG. 7 is a block diagram illustrating an example of a configuration of an information processing apparatus 100-2 according to the second embodiment. As illustrated in FIG. 7, the information processing apparatus 100-2 includes the display unit 111, a storage unit 121-2, the reception unit 101, a recognition unit 102-2, an update unit 103-2, and the output control unit 104.

In the second embodiment, functions of the storage unit 121-2, the recognition unit 102-2, and the update unit 103-2 are different from those of the first embodiment. The other configurations and functions are similar to those of FIG. 1, which illustrates a block diagram of the information processing apparatus 100 according to the first embodiment. Therefore, the other configurations and functions are denoted by the same reference numerals and description thereof will be omitted here.

The storage unit 121-2 is different from the storage unit 121 of the first embodiment in that, order information to which weights are assigned is stored. For example, in the second embodiment, the order information is represented by a weighted directed acyclic graph in which pieces of meta-information is are defined as nodes and the nodes are connected by weighted directed edges.

Figure 8:
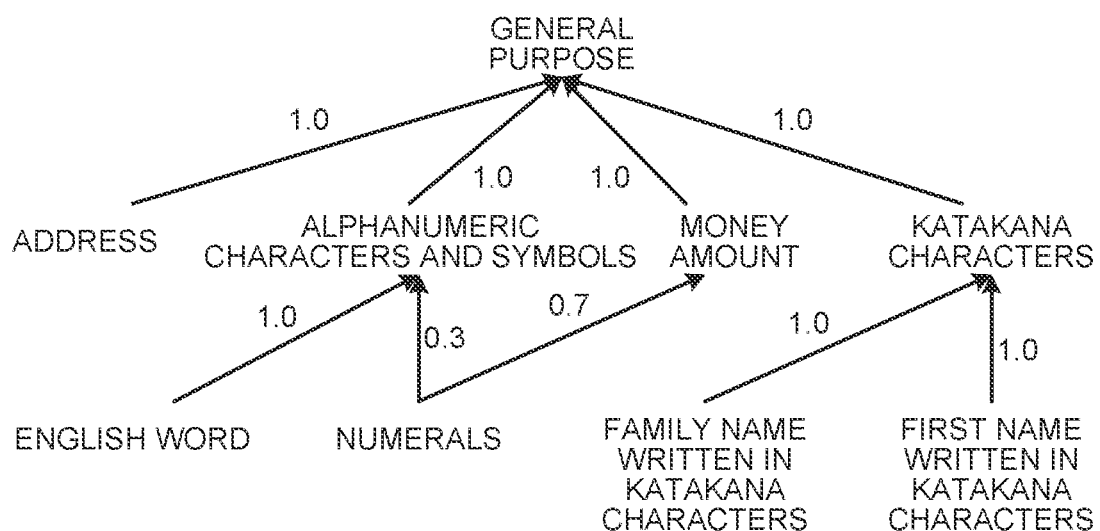
FIG. 8 is a graph illustrating an example of a data structure of order information according to the second embodiment.

FIG. 8 is a graph illustrating an example of a data structure of the order information according to the second embodiment. The weighted directed acyclic graph is effective when there is a node connected to two or more nodes, such as "numerals" in FIG. 8. Note that the first embodiment can be regarded as a special case in which all weights are set to 1 in the present embodiment.

Any method may be employed as a method of determining the weight. For example, a method of statistically determining the weights on the basis of appearance frequencies of pieces of meta-information in an owned data set (learning data, recognized ledger sheet data, etc.) and a method of determining the weights on the basis of the degrees of importance of pieces of meta-information in an application can be applied.

The recognition unit 102-2 is different from the recognition unit 102 of the first embodiment in that, an evaluation value is calculated on the basis of the weight and a confidence score to evaluate a result of the recognition by using the evaluation value. The update unit 103-2 is different from the update unit 103 of the first embodiment in that, the meta-information is updated using the evaluation value instead of the confidence score.

Figure 9:
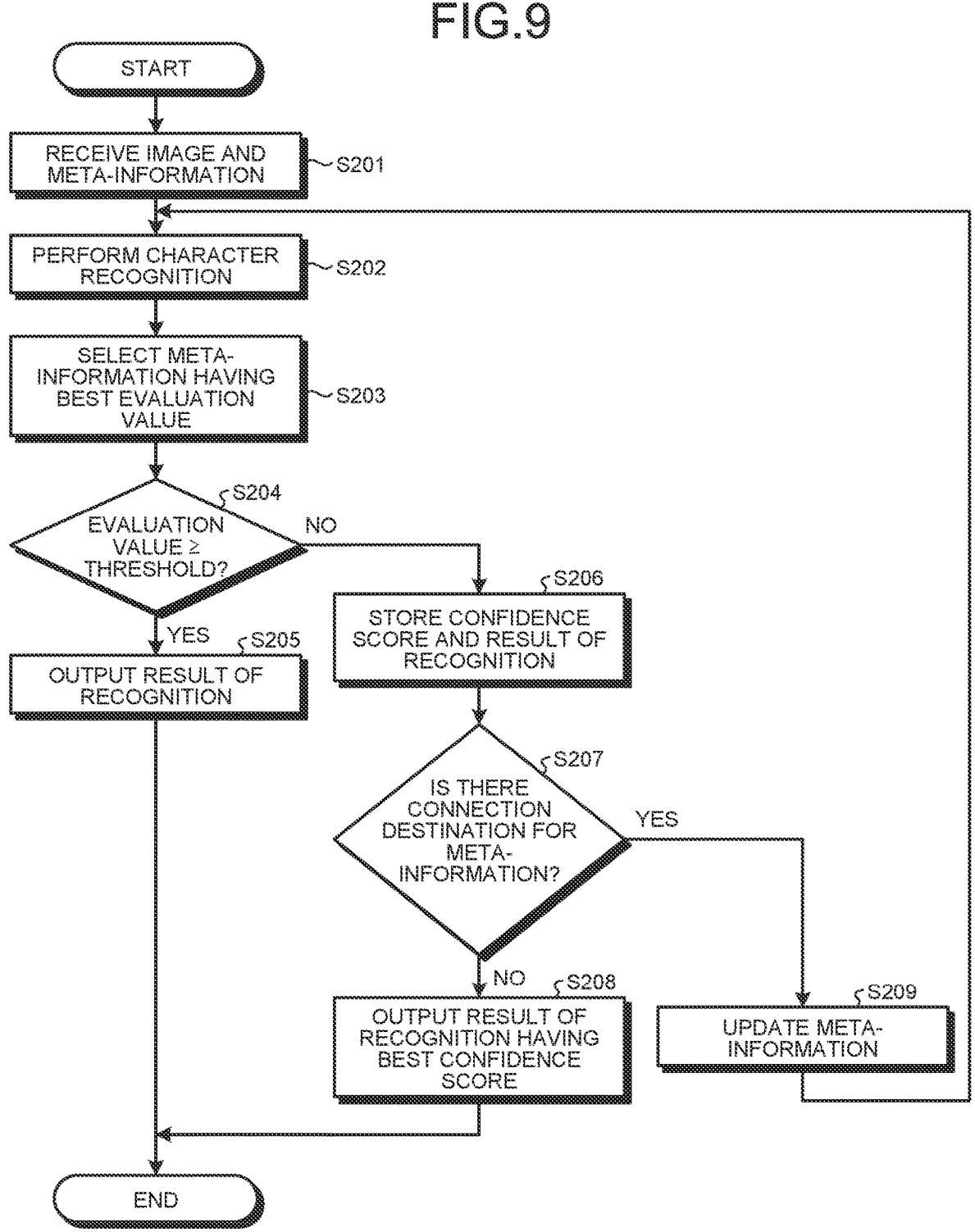
FIG. 9 is a flowchart illustrating an example of a recognition process according to the second embodiment.

Next, a recognition process by the information processing apparatus 100-2 according to the second embodiment configured as described above will be described with reference to FIG. 9. FIG. 9 is a flowchart illustrating an example of the recognition process according to the second embodiment.

The reception unit 101 receives an image to be recognized and the meta-information (Step S201). The recognition unit 102-2 performs the character recognition on the received image and meta-information, predicts the likely character string and the confidence score of the character string, and outputs the predicted confidence score and character string (Step S202).

In the character recognition initially performed, the weight is set to 1, and one piece of specified meta-information is used. In the second and subsequent character recognition, the number of connection destinations of the meta-information can be two or more, so that two or more pieces of specified meta-information is used in some cases. Moreover, a weight having been assigned to a directed edge connecting pieces of meta-information before and after update is set as the weight. The recognition unit 102-2 outputs a pair of a result of the character recognition and the confidence score, for one or more pieces of specified meta-information and the image.

The recognition unit 102-2 selects a piece of meta-information having the best evaluation value that is calculated on the basis of the weight and the confidence score (Step S203). The recognition unit 102-2 selects a piece of meta-information according to, for example, the following procedure.

The number of pieces of specified meta-information is set to M (M is an integer of 1 or more), and each piece of meta-information, weight, result of the recognition, and confidence score is expressed as $m_i$, $w_i$, $r_i$ and $s_i$ (i=1, 2, ..., and N), respectively. First, the recognition unit 102-2 calculates the evaluation value, for example, according to the following Formula (1), A symbol g is a predetermined function for calculating the evaluation value. The following "g" is an example of the function in which a product of the confidence score and the weight is treated as the evaluation value.

$$g(w_i, s_i) = w \times s \tag{1}$$

Next, the recognition unit 102-2 selects a piece of meta-information m* having the best evaluation value, according to the following Formula (2) (Step S203).

$$m^* = \mathrm{argmax}_1(g(w_i, s_i)) \tag{2}$$

The recognition unit 102-2 determines whether the evaluation value corresponding to the selected piece of meta-information m* is equal to or larger than a threshold (Step S204). When the evaluation value is equal to or larger than the threshold (Step S204: Yes), the recognition unit 102-2 outputs the predicted. character string as a result of the recognition (Step S205), and finishes the recognition process. When the evaluation value is not equal to or larger than the threshold (Step S204: No), the recognition unit 102-2 stores the pair of the result of the character recognition and the confidence score corresponding to the selected piece of meta-information m*, in the storage unit 121 (Step S206).

The update unit 103-2 determines whether there is the connection destination for the specified piece of meta-information (meta-information used for the character recognition) (Step S207). When there is no connection destination for the specified piece of meta-information (Step S207: No), the update unit 103-2 outputs a result of the recognition having the best confidence score from the results of the recognition having been stored in the storage unit 121 (Step S208), and finishes the recognition process.

When there is the connection destination for the specified piece of meta-information (Step S207: Yes), the update unit 103-2 updates the piece of meta-information in accordance with the order information (Step S209). For example, the update unit 103-2 updates the piece of meta-information to another piece of meta-information corresponding to the connection destination node defined in the order information.

In the present embodiment, the update unit 103-2 outputs, to the recognition unit 102-2, the updated piece of meta-information while associating it with the weight assigned to the directed edge before and after update. In a case where there are two or more connection destination nodes, the update unit 103-2 outputs pieces of meta-information corresponding to the nodes while associating those pieces of meta-information with the weights.

After that, the process returns to Step S202, and the character recognition by the recognition unit 102-2 is executed again using the updated one or more pieces of meta-information.

As described above, in the information processing apparatus according to the second embodiment, use of the weighted directed acyclic graph makes it possible to have more flexible design, implementing highly accurate recognition.

Third Embodiment

An information processing apparatus according to a third embodiment has a function of correcting order information indicating the order of meta-information.

Figure 10:
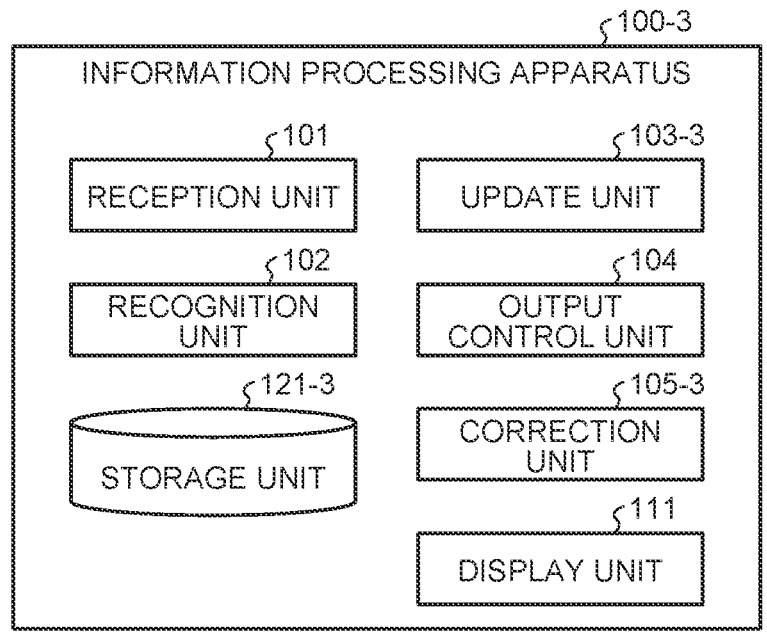
FIG. 10 is a block diagram illustrating an example of a configuration of an information processing apparatus according to a third embodiment.

FIG. 10 is a block diagram illustrating an example of a configuration of an information processing apparatus 100-3 according to the third embodiment. As illustrated in FIG. 10, the information processing apparatus 100-3 includes the display unit 111, a storage unit 121-3, the reception unit 101, the recognition unit 102, an update unit 103-3, an output control unit 104, and a correction unit 105-3.

The third embodiment is different from the first embodiment in functions of the storage unit 121-3 and the update unit 103-3 and in that, the correction unit 105-3 is added. The other configurations and functions are similar to those of FIG. 1, which illustrates a block diagram of the information processing apparatus 100 according to the first embodiment. Therefore, the other configurations and functions are denoted by the same reference numerals and description thereof will be omitted here.

The storage unit 121-3 is different from the storage unit 121 of the first embodiment in that, an update history showing update of the meta-information by the update unit 103-3 is further stored. For example, the storage unit 121-3 stores a history in which pieces of meta-information before and after update are associated with each other.

The update unit 103-3 is different from the update unit 103 of the first embodiment in that, the update unit 103-3 has a function of storing the update history as described above, in the storage unit 121, upon updating the meta-information.

The correction unit 105-3 corrects at least part of the order of the pieces of meta-information, defined in the order information, on the basis of the update history of the meta-information in the past. For example, the correction unit 105-3 changes the direction of a directed edge in a directed acyclic graph, and corrects the order of pieces of meta.-information.

Figure 11:
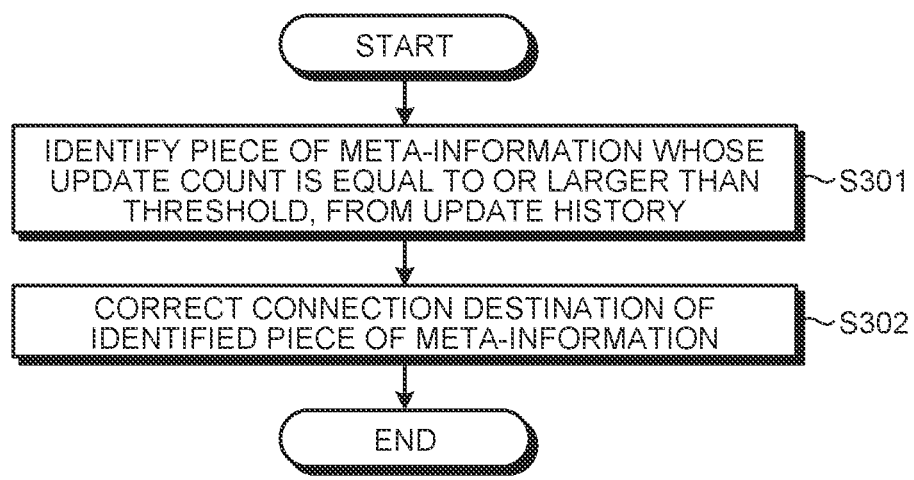
FIG. 11 is a flowchart illustrating an example of a correction process according to the third embodiment.

Next, a correction process for the meta-information by the information processing apparatus 100-3 according to the third embodiment configured as described above will be described with reference to FIG. 11. FIG. 11 is a flowchart illustrating an example of the correction process according to the third embodiment. Note that the correction process may be performed at any timing, for example, every certain period of time or every time the character recognition is performed certain number of times.

The correction unit 105-3 identifies a piece of meta-information to be corrected with referring to the update history stored in the storage unit 121-3. For example, the correction unit 105-3 identifies a piece of meta-information whose update count is equal to or larger than a threshold (Step S301). The correction unit 105-3 corrects a connection destination of the identified piece of meta-information in the order information (Step S302). For example, the correction unit 105-3 corrects the directed edge in the order information such that the connection destination of the identified piece of meta-information is changed to another start node connected to the same connection destination. A method for correction by the correction unit 105-3 is not limited to the above method, and any method may be employed.

Figure 12:
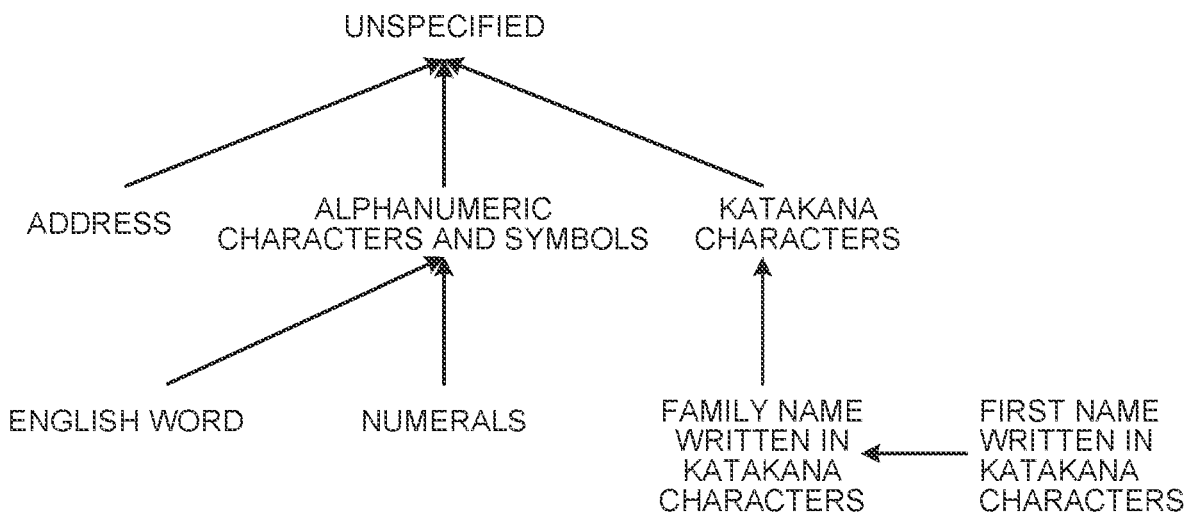
FIG. 12 is a graph illustrating an example of corrected order information.

It is assumed, for example, that "family name written in katakana characters" is often erroneously filled in the field of "first name written in katakana characters" due to the influence of the design of a ledger sheet handled by the user. In this case, the update history has increased frequency of updating "first name written in katakana characters" to "katakana characters", The correction unit 105-3 corrects, with referring to such update history, the directed edge such that the connection destination node of "first name written katakana characters" is changed to, for example, the node "family name written in katakana characters" that is the another start node connected to "katakana characters". FIG. 12 is a graph illustrating an example of the order information obtained by correcting the order information of FIG. 2 in this manner.

In the subsequent steps of the recognition process, the corrected order information is used. This configuration makes it possible to improve the possibility of correctly recognizing information about the family name written in katakana characters, erroneously filled.

As described above, the information processing apparatus according to the third embodiment further includes the function of correcting the order information, thereby further improving the recognition accuracy.

Fourth Embodiment

In the above description, the accuracy of the character recognition process using the meta-information is improved by correcting the meta-information by using the order information. A process using the order information is not limited to the recognition process, An example will be described in which an information processing apparatus according to a fourth embodiment improves the accuracy of an estimation process of estimating the meta-information by using order information.

The estimation process for the meta-information is used, for example, to estimate a piece of meta-information to be set to each field in order to recognize characters from an image of a ledger sheet (character string image), on the basis of the character string image.

Figure 13:
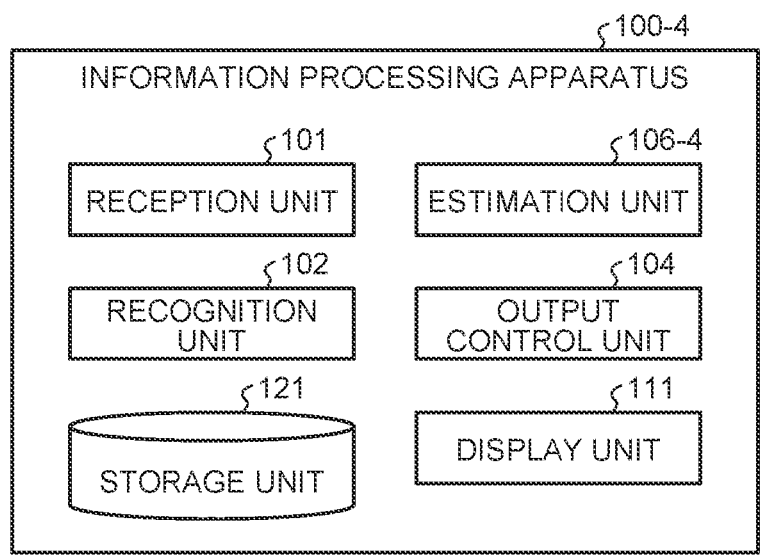
FIG. 13 is a block diagram illustrating an example of a configuration of an information processing apparatus according to a fourth embodiment.

FIG. 13 is a block diagram illustrating an example of a configuration of an information processing apparatus 100-4 according to the fourth embodiment. As illustrated in FIG. 13, the information processing apparatus 100-4 includes the display unit 111, the storage unit 121, the reception unit 101, the recognition unit 102. an estimation unit 106-4, and the output control unit 104.

The fourth embodiment is different from the first embodiment in that, the estimation unit 106-4 is provided instead of the update unit 103. The other configurations and functions are similar to those of FIG. 1, which illustrates a block diagram of the information processing apparatus 100 according to the first embodiment. Therefore, the other configurations and functions are denoted by the same reference numerals and description thereof will be omitted here.

Figure 14:
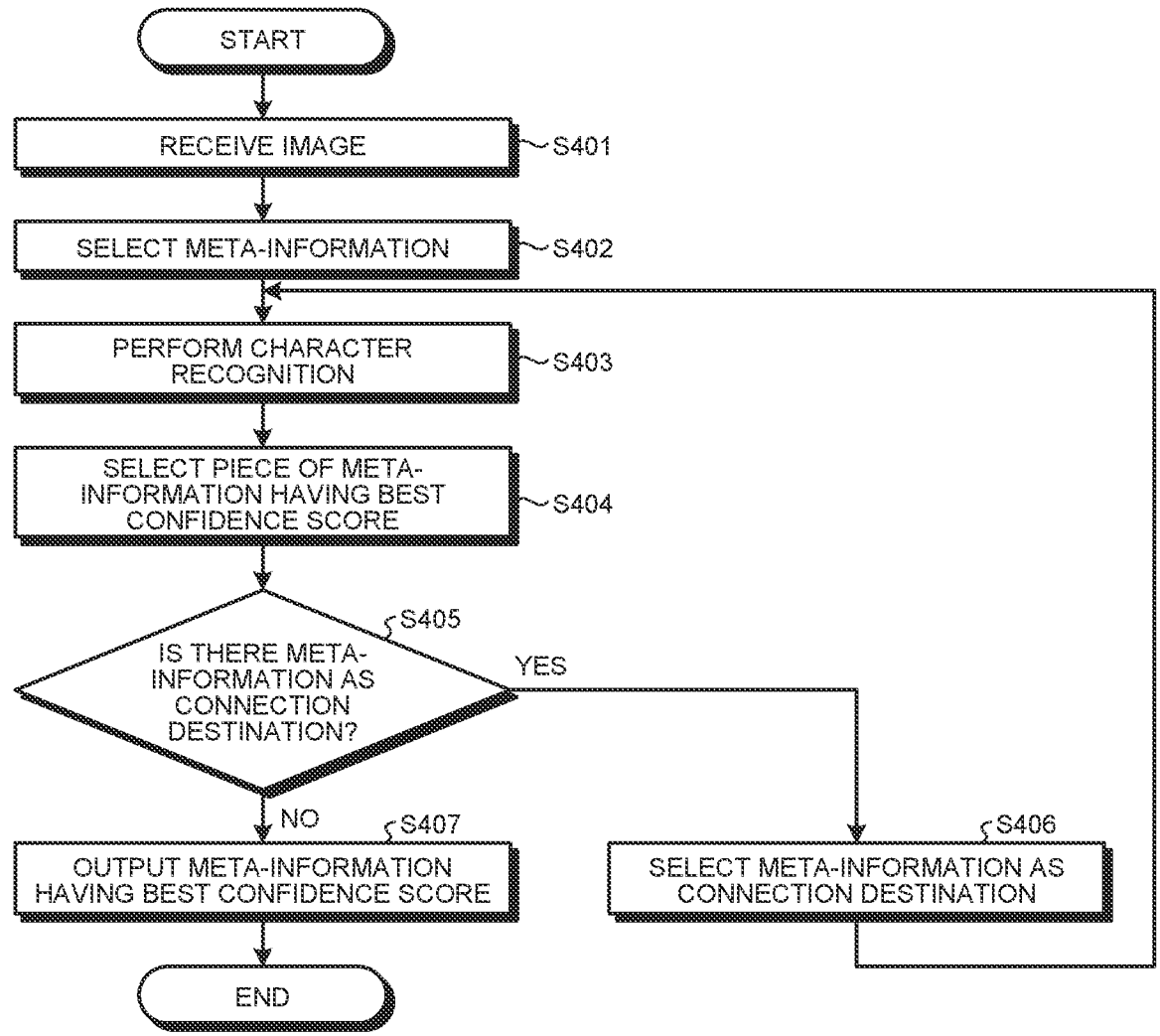
FIG. 14 is a flowchart illustrating an example of an estimation process according to the fourth embodiment.

The estimation unit 106-4 estimates the meta-information of the character string included in the image, from a result of the character recognition on the image. For example, the estimation unit 106-4 sequentially selects pieces of meta-information, on the basis of a specified piece of meta-information (e.g., a piece of meta-information corresponding to a top node) and the order information, and calculates confidence scores of the character recognition using the selected pieces of meta-information. The estimation unit 106-4 estimates the meta-information of the character string included in the image, on the basis of the calculated confidence scores. For example, the estimation unit 106-4 outputs, as a result of the estimation, a piece of meta-information having a better confidence score than the other pieces of meta-information, Next, the estimation process for the meta-information performed by the information processing apparatus 100-4 according to the fourth embodiment configured as described above will be described with reference to FIG. 14. FIG. 14 is a flowchart illustrating an example of the estimation process according to the fourth embodiment.

The reception unit 101 receives an image to be recognized (Step S401). The estimation unit 106-4 selects a piece of meta-information to be specified upon character recognition (Step S402). In the first character recognition, the estimation unit 106-4 selects, for example, one or more pieces of meta-information corresponding to the top node (node having no connection destination).

The recognition unit 102 performs the character recognition on the received image and the selected pieces of meta-information, predicts a likely character string and the confidence score of the character string, and stores the predicted confidence score and character string (result of the recognition) in the storage unit 121 (Step S403), The recognition unit 102 selects a piece of meta-information having the best confidence score (Step S404).

The estimation unit 106-4 determines whether there is a piece of meta-information that is connected to the piece of meta-information used for the character recognition (Step S405). For example, the estimation unit 106-4 makes a reference to the order information and searches for a piece of meta-information corresponding to a connection source node that has a connection destination being the piece of meta-information used for the character recognition. When there is the connection source node, the estimation unit 106-4 determines that there is the piece of meta-information that is connected to the piece of meta-information used for the character recognition. When the piece of meta-information used for the character recognition is a bottom node, the estimation unit 106-4 determines that there is no piece of meta-information that is connected to the piece of meta-information used for the character recognition.

When there is no piece of meta-information that is connected to the piece of meta-information used for the character recognition (Step S405: No), the estimation unit 106-4 outputs, as the result of the estimation, a piece of meta-information for which a result of the recognition having the best confidence score is obtained, from the results of recognition having been stored in the storage unit 121 (Step S407), and finishes the estimation process. The estimation unit 106-4 may output the confidence score and the result of the recognition, together with the piece of meta-information that is the result of the estimation.

When there is the connection destination (Step S405: Yes), the estimation unit 106-4 updates the piece of meta-information in accordance with the order information (Step S406). For example, the estimation unit 106-4 updates the selected piece of meta-information to the piece of meta-information corresponding to the connection source node that is defined in the order information. In the order information as illustrated in FIGS. 2 and 3, a piece of meta-information is updated to another piece of meta-information belonging to a smaller set.

After that, the process returns to Step S403, and the character recognition is performed again by the recognition unit 102 by using the updated meta-information.

A specific example of the estimation process will be described below. It is assumed that the order information as illustrated in FIG. 2 is defined and the image to be recognized is the character string image including the character string "MAIKERU" (corresponding to "Michael" in the English language). First, the estimation unit 106-4 inputs, as the meta-information, "unspecified" to the recognition unit 102. At this time, it is assumed that the confidence score is "0.6".

Next, the estimation unit 106-4 inputs, as the meta-information, "address", "alphanumeric characters and symbols", and "katakana characters" that are connected to "unspecified", to the recognition unit 102. At this time, it is assumed that the confidence scores are "0.5", "0.1", and "0.8", respectively.

In this case, the estimation unit 106-4 inputs, as the meta-information, "family name written in katakana Characters" and "first name written in katakana characters" that are connected to "katakana characters" having the best confidence score, to the recognition unit 102. At this time, it is assumed that the confidence scores are "0.6" and "0.3", respectively.

There is no node connected to "family name written in katakana characters" or "first name written in katakana characters". Thus, the estimation unit 106-4 outputs "katakana characters" having the best confidence score "0.8", as the result of the estimation of the meta-information.

The estimation process as described above may be performed for a single character string image or may be performed for plural character string images. For example, in a case where the meta-information is estimated from the plural character string images assumed to have the same meta-information, the above-described estimation process can be applied.

For example, the estimation unit 106-4 performs processing similar to that performed upon inputting the single character string image, for all character string images. and outputs a mode value of the output meta-information, as the result of the estimation. The best evaluation of the result of the estimation is not limited to this method. For example, the estimation unit 106-4 may output, as the result of the estimation, meta-information having the best evaluation value in weighted voting with the confidence score as a weight. Majority voting using the results of the recognition on the plural character string images makes it possible to perform more highly accurate estimation of the meta-information.

Third Modification

As in the first modification of the first embodiment, the number of pieces of order information indicating the meta-information is not limited to one, and may be N or more (N is an integer of 2 or more). The estimation unit 106-4 selects pieces of meta-information sequentially from the top node, for each of the N pieces of order information, and inputs the selected pieces of meta-information to the recognition unit 102. The estimation unit 1.06-4 estimates the meta-information having the best confidence score for each of the N pieces of order information, and outputs the meta information.

In this way, in the information processing apparatus according to the fourth embodiment, a likely meta-information (node) is preferentially searched for in the order in accordance with the order information, such as a directed acyclic graph, and therefore, the estimation process for the meta-information can be implemented more efficiently.

As described above, according to the first to fourth embodiments, the recognition accuracy of the character recognition process using the meta-information or the efficiency of the estimation process for the meta-information can be improved.

Figure 15:
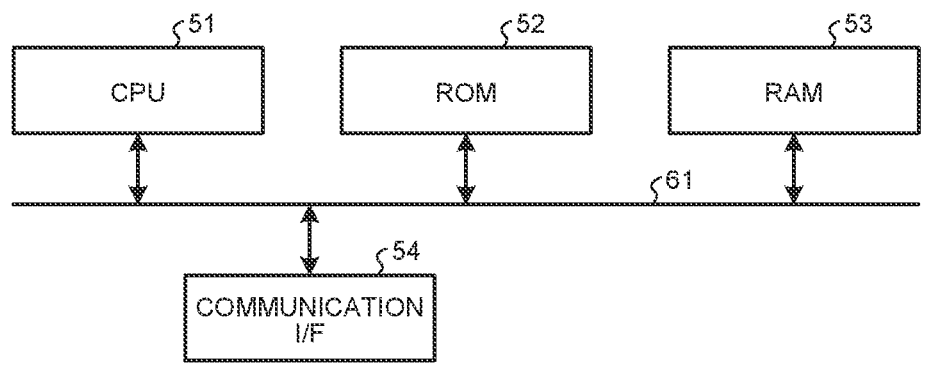
FIG. 15 is an explanatory diagram illustrating a hardware configuration example of each of the information processing apparatuses according to the first to fourth embodiments.

Next, the information processing apparatus according to the first to fourth embodiments have a hardware configuration, and the hardware configuration will be described with reference to FIG. 15. FIG. 15 is an explanatory diagram illustrating a hardware configuration example of each of the information processing apparatuses according to the first to fourth embodiments.

The information processing apparatuses according to the first to fourth embodiments each includes a control device such as a central processing unit (CPU) 51, a storage device such as a read only memory (ROM) 52 and a random access memory (RAM) 53, a communication I/F 54 that is connected to a network to perform communication, and a bus 61 that connects the units.

A computer program executed by each of the information processing apparatuses according to the first to fourth embodiments may be provided by being incorporated in the ROM 52 or the like in advance.

A computer program executed by each of the information processing apparatuses according to the first to fourth embodiments may be configured to be provided as a computer program product, in the form of installable or executable file data and recorded on a computer-readable recording medium, such as a compact disk read only memory (CD-ROM), flexible disk (FD), compact disk recordable (CD-R), digital versatile disk (DVD).

Moreover, a computer program executed by each of the information processing apparatuses according to the first to fourth embodiments may be configured to be stored on a computer connected to a network such as the Internet and provided by being downloaded via the network. Moreover, a computer program executed by each of the information processing apparatuses according to the first to fourth embodiments may be configured to be provided or distributed via a network such as the Internet.

A computer program executed by each of the information processing apparatuses according to the first to fourth embodiments can cause a computer to function as the units of each information processing apparatus described above. In the computer, the CPU 51 is configured to read a computer program from a computer-readable storage medium into a main storage device and execute the program.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory configured to store order information in which an order of pieces of meta-information for a character to be recognized is defined;
one or more hardware processors connected to the memory and configured to function as
a recognition unit to perform character recognition on an image including a character string by using first meta-information specified from the pieces of the meta-information, and
an update unit to update the first meta-information to second meta-information in accordance with the order information in a case when a confidence score of the character recognition satisfies a predetermined condition, wherein
the recognition unit performs the character recognition by using the second meta-information,
the order information is represented by a directed acyclic graph in which the pieces of the meta-information are defined as nodes and the nodes are connected by directed edges with weights, and
the update unit updates the first meta-information to second meta- information, on the basis of evaluation values obtained from the weights and the confidence scores.

2. The information processing apparatus according to claim 1, wherein
the order information is represented by a directed acyclic graph in which the pieces of the meta-information are defined as nodes and the nodes are connected by directed edges, and
the update unit updates the first meta-information to the second meta-information connected to the first meta-information by a corresponding directed edge.

3. The information processing apparatus according to claim 1, wherein the recognition unit performs the character recognition by using a neural network into which the first meta-information and the image are input and from which a result of the recognition is output.

4. The information processing apparatus according to claim 1, wherein
the recognition unit performs the character recognition by using first meta-information specified from the pieces of the meta-information to which their respective weights are assigned, and
the update unit updates the first meta-information to the second meta-information in accordance with the order information in a case when an evaluation value obtained from the weight and the confidence score satisfies a predetermined condition.

5. The information processing apparatus according to claim 1, wherein the one or more hardware processors are further configured to function as a correction unit to correct at least part of the order of the pieces of meta-information defined in the order information, on the basis of an update history showing update by the update unit.

6. The information processing apparatus according to claim 1, wherein the one or more hardware processors are further configured to function as an output control unit to display the meta-information on a display device in accordance with the order defined in the order information.

7. An information processing apparatus comprising:
a memory configured to store order information in which an order of pieces of meta-information for a character to be recognized is defined;
one or more hardware processors connected to the memory and configured to function as
a recognition unit to perform character recognition on an image including a character string by using first meta-information specified from the pieces of the meta-information, and
an update unit to update the first meta-information to second meta-information in accordance with the order information in a case when a confidence score of the character recognition satisfies a predetermined condition, wherein
the recognition unit performs the character recognition by using the second meta-information,
the order information is represented by a directed acyclic graph in which the pieces of the meta-information are defined as nodes and the nodes are connected by directed edges,
the directed acyclic graph represents the order information in which the meta-information closer to a bottom node has subdivided sets represented by the meta-information, or the directed acyclic graph represents the order information in which the meta-information closer to a top node has subdivided sets represented by the meta-information,
the memory is configured to store N pieces of order information (N is an integer of 2 or more), and
the recognition unit performs the character recognition by using N pieces of first meta-information specified from N pieces of meta-information defined in the N pieces of the order information.

8. An information processing method comprising:
performing character recognition on an image including a character string by using first meta-information specified from pieces of meta-information for a character to be recognized; and
updating the first meta-information to second meta-information in accordance with order information in which an order of the pieces of the meta-information is defined, the updating of the first meta-information being performed in a case when a confidence score of the character recognition satisfies a predetermined condition,
wherein
the character recognition is performed by using the second meta-information,
the order information is represented by a directed acyclic graph in which the pieces of the meta-information are defined as nodes and the nodes are connected by directed edges with weights, and
the updating includes updating the first meta-information to second meta-information, on the basis of evaluation values obtained from the weights and the confidence scores.

9. A computer program product comprising a non-transitory computer-readable recording medium on which a program executable by a computer is recorded, the program instructing the computer to execute:
performing character recognition on an image including a character string by using first meta-information specified from pieces of meta-information for a character to be recognized; and
updating the first meta-information to second meta-information in accordance with order information in which an order of the pieces of the meta-information is defined, the update of the first meta-information being performed in a case when a confidence score of the character recognition satisfies a predetermined condition,
wherein
the character recognition is performed by using the second meta- information,
the order information is represented by a directed acyclic graph in which the pieces of the meta-information are defined as nodes and the nodes are connected by directed edges with weights, and
the updating includes updating the first meta-information to second meta-information, on the basis of evaluation values obtained from the weights and the confidence scores.

10. An information processing apparatus comprising:
a memory configured to store order information in which an order of pieces of meta-information for a character to be recognized is defined;
one or more hardware processors connected to the memory and configured to function as
a recognition unit to perform character recognition on an image including a character string by using first meta-information specified from the pieces of the meta-information and one or more pieces of second meta-information selected on the basis of the order information and the first meta-information, and
an estimation unit to estimate meta-information of the character string included in the image on the basis of a confidence score of the character recognition on the first meta-information and a confidence score of the character recognition on the second meta-information,
wherein
the order information is represented by a directed acyclic graph in which the pieces of the meta-information are defined as nodes and the nodes are connected by directed edges,
the directed acyclic graph represents the order information in which the meta-information closer to a bottom node has subdivided sets represented by the meta-information, or the directed acyclic graph represents the order information in which the meta-information closer to a top node has subdivided sets represented by the meta-information, the memory is configured to store N pieces of order information (N is an integer of 2 or more), and the recognition unit performs the character recognition by using N pieces of first meta-information specified from N pieces of meta-information defined in the N pieces of the order information.

11. The information processing apparatus according to claim 10, wherein the estimation unit estimates, as the meta-information of the character string included in the image, meta-information corresponding to the better confidence score than the other confidence score out of: the confidence score of the character recognition on the first meta-information, and the confidence score of the character recognition on the second meta-information.

12. The information processing apparatus according to claim 10, wherein the recognition unit performs the character recognition by using a neural network into which the meta-information and the image are input and from which a result of the recognition is output.

13. An information processing method, implemented by a computer, the method comprising:

performing character recognition on an image including a character string by using first meta-information specified from pieces of meta-information for a character to be recognized and one or more pieces of second meta-information selected on the basis of order information in which an order of the pieces of the meta-information is defined and the first meta-information; and estimating meta-information of the character string included in the image on the basis of a confidence score of the character recognition on the first meta-information and a confidence score of the character recognition on the second meta-information, wherein the order information is represented by a directed acyclic graph in which the pieces of the meta-information are defined as nodes and the nodes are connected by directed edges, the directed acyclic graph represents the order information in which the meta-information closer to a bottom node has subdivided sets represented by the meta-information, or the directed acyclic graph represents the order information in which the meta-information closer to a top node has subdivided sets represented by the meta-information, and the character recognition is performed by using N pieces of first meta-information (N is an integer of 2 or more) specified from N pieces of meta-information defined in N pieces of the order information that is stored in a memory.

14. A computer program product comprising a non-transitory computer-readable recording medium on which a program executable by a computer is recorded, the program instructing the computer to execute:

performing character recognition on an image including a character string by using first meta-information specified from pieces of meta-information for a character to be recognized and one or more pieces of second meta-information selected on the basis of order information in which an order of the pieces of the meta-information is defined and the first meta-information; and estimating meta-information of the character string included in the image on the basis of a confidence score of the character recognition on the first meta-information and a confidence score of the character recognition on the second meta-information, wherein the order information is represented by a directed acyclic graph in which the pieces of the meta-information are defined as nodes and the nodes are connected by directed edges, the directed acyclic graph represents the order information in which the meta-information closer to a bottom node has subdivided sets represented by the meta-information, or the directed acyclic graph represents the order information in which the meta-information closer to a top node has subdivided sets represented by the meta-information, the character recognition is performed by using N pieces of first meta-information (N is an integer of 2 or more) specified from N pieces of meta-information defined in N pieces of the order information that is stored in a memory.

15. A non-transitory computer-readable recording medium on which order information is recorded, wherein the order information is used for character recognition performed by an information processing apparatus including a hardware circuit and a memory, the order information is stored in the memory, and the order information is represented by a directed acyclic graph in which pieces of meta-information for a character to be recognized are defined as nodes and the nodes are connected by directed edges, wherein the directed acyclic graph represents the order information in which the meta-information closer to a bottom node has subdivided sets represented by the meta-information, or the directed acyclic graph represents the order information in which the meta-information closer to a top node has subdivided sets represented by the meta-information.

16. The order information according to claim 15, wherein the character recognition is performed on an image including a character string by the hardware circuit by using first meta-information specified from the pieces of the meta-information.

17. The order information according to claim 16, wherein the first meta-information is updated, by the hardware circuit, to second meta-information connected to the first meta-information by a corresponding directed edge in accordance with the order information, the first meta-information being updated in a case when a confidence score of the character recognition satisfies a predetermined condition.

* * * * *